(12) United States Patent
Zhang et al.

(10) Patent No.: US 11,700,284 B2
(45) Date of Patent: Jul. 11, 2023

(54) METHOD, SYSTEM, AND RELATED DEVICE FOR MANAGING MEDIA TRANSMISSION PATH

(71) Applicant: HUAWEI TECHNOLOGIES CO., LTD., Guangdong (CN)

(72) Inventors: Biao Zhang, Shenzhen (CN); Yongge Xue, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 45 days.

(21) Appl. No.: 16/990,773

(22) Filed: Aug. 11, 2020

(65) Prior Publication Data

US 2020/0374323 A1  Nov. 26, 2020

Related U.S. Application Data

(63) Continuation of application No. PCT/CN2019/074772, filed on Feb. 11, 2019.

(30) Foreign Application Priority Data

Feb. 12, 2018 (CN) .......................... 201810147201.2

(51) Int. Cl.
*H04L 65/1023* (2022.01)
*H04L 65/1063* (2022.01)
(Continued)

(52) U.S. Cl.
CPC ...... *H04L 65/1026* (2013.01); *H04L 65/1063* (2013.01); *H04L 67/131* (2022.05); *H04L 67/141* (2013.01); *H04L 67/63* (2022.05)

(58) Field of Classification Search
CPC ............. H04L 65/1026; H04L 65/1063; H04L 67/141; H04L 67/327; H04L 67/38
(Continued)

(56) References Cited

U.S. PATENT DOCUMENTS 10,609,602 B2 * 3/2020 Maeda .................. H04W 36/32
10,728,949 B2 * 7/2020 Sun ........................ H04W 76/19
(Continued)

FOREIGN PATENT DOCUMENTS

CN  101616404 A  12/2009
CN  102025702 A  4/2011
(Continued)

OTHER PUBLICATIONS

S2-182359 Huawei, HiSilicon,"Solution for IMS traffic local routing",SA WG2 Meeting #126,Feb. 26 Mar. 2, 2018, Montreal, Canada,total 3 pages.

*Primary Examiner* — Cheikh T Ndiaye
*Assistant Examiner* — Ayele F Woldemariam
(74) *Attorney, Agent, or Firm* — Womble Bond Dickinson (US) LLP (57) ABSTRACT

A method for managing a media transmission path includes: obtaining location information of a terminal; determining an application function user plane anchor device corresponding to the terminal, and an application function user plane edge device that has a minimum transmission delay, where the transmission delay is between the application function user plane edge device and the terminal; establishing media transmission paths between the application function user plane anchor device and the application function user plane edge device, and between the application function user plane edge device and the terminal; selecting a new application function user plane edge device when a location of the terminal changes; and handing over the terminal to the new application function user plane edge device. This method reduces a delay of a media transmission path, and can better meet a requirement of a delay sensitive service.

18 Claims, 5 Drawing Sheets

(51) Int. Cl.
   *H04L 67/141* (2022.01)
   *H04L 67/63* (2022.01)
   *H04L 67/131* (2022.01)
(58) Field of Classification Search
   USPC .......................................................... 370/401
   See application file for complete search history.

(56) References Cited

U.S. PATENT DOCUMENTS

| | | | |
|---|---|---|---|
| 2014/0079054 A1 | 3/2014 | Guedalia et al. | |
| 2016/0135107 A1* | 5/2016 | Hampel | H04W 76/10 370/238 |
| 2017/0086049 A1* | 3/2017 | Vrzic | H04W 40/00 |

FOREIGN PATENT DOCUMENTS

| | | | | |
|---|---|---|---|---|
| CN | 102904791 A | 1/2013 | | |
| CN | 102938919 A | 2/2013 | | |
| CN | 104040998 A | 9/2014 | | |
| CN | 105163285 A | 12/2015 | | |
| CN | 107241269 A | 10/2017 | | |
| CN | 107404715 A | 11/2017 | | |
| CN | 107484224 A | 12/2017 | | |
| EP | 3107352 A1 * | 12/2016 | ........... | H04L 67/143 |
| WO | 2015035026 A1 | 3/2015 | | |
| WO | WO-2015035026 A1 * | 3/2015 | ........... | H04L 65/103 |
| WO | 2017195851 A1 | 11/2017 | | |
| WO | WO-2017195851 A1 * | 11/2017 | ........... | H04W 40/36 |

* cited by examiner

METHOD, SYSTEM, AND RELATED DEVICE FOR MANAGING MEDIA TRANSMISSION PATH

CROSS-REFERENCE TO RELATED APPLICATIONS

This application is a continuation of International Application No. PCT/CN2019/074772, filed on Feb. 11, 2019, which claims priority to Chinese Patent Application No. 201810147201.2, filed on Feb. 12, 2018, The disclosures of the aforementioned applications are hereby incorporated by reference in their entireties.

TECHNICAL FIELD

This disclosure relates to the communications field, and in particular, to a method, a system, and a related device for managing a media transmission path.

BACKGROUND

A delay sensitive service has a relatively high requirement on a delay of a media transmission path. For example, a virtual reality (VR) or augmented reality (AR) communication service requires a delay to be less than 20 ms. An existing method for establishing a media transmission path does not meet a delay requirement of the VR/AR communication service, and user experience is severely affected.

One example objective of this disclosure is to reduce the delay of the media transmission path, to meet a low delay requirement of a delay sensitive service.

SUMMARY

In view of this, it is necessary to provide a method for managing a media transmission path to reduce a delay of the media transmission path, to meet a requirement of a delay sensitive service.

One embodiment of this application provides a method for managing a media transmission path. The method is applied to a first application function control plane device, and the method includes: obtaining a first location of a first terminal; determining a first application function user plane anchor device corresponding to the first terminal, and determining a first application function user plane edge device from first available application function user plane edge devices, where the first application function user plane edge device is an application function user plane edge device that has a minimum transmission delay in the first available application function user plane edge devices, where the transmission delay is between the first application function user plane edge device and the first terminal at the first location, and the first available application function user plane edge devices include one or more application function user plane edge devices that can be used by the first terminal at the first location, establishing a first media transmission path and a second media transmission path, where the first media transmission path is used to transmit media content between the first application function user plane anchor device and the first application function user plane edge device, and the second media transmission path is used to transmit media content between the first application function user plane edge device and the first terminal.

Because a terminal location factor is considered when the first application function user plane edge device is selected in the method, it is ensured that a transmission delay between the first application function user plane edge device and the first terminal is minimized, and thus a transmission delay between the application function user plane anchor device and the first terminal is minimized. This can better meet a low delay requirement of a delay sensitive service. Because the application function control plane device can switch to a low delay transmission path in time when the location of the terminal changes, a low delay requirement of a delay sensitive service is further met.

In one embodiment, the determining, by the first application function control plane device, a first application function user plane edge device from first available application function user plane edge devices includes: determining, from the first available application function user plane edge devices, an application function user plane edge device whose physical location is closest to the first location as the first application function user plane edge device; or determining, from the first available application function user plane edge devices, an application function user plane edge device having a maximum transmission bandwidth as the first application function user plane edge device, where the transmission bandwidth is between the application function user plane edge device and the first terminal; or determining, from the first available application function user plane edge devices, an application function user plane edge device with the lightest load as the first application function user plane edge device.

In one embodiment, the establishing, by the first application function control plane device, a first media transmission path includes: separately sending a bearer establishment request to the first application function user plane anchor device and the first application function user plane edge device.

In one embodiment, the establishing, by the first application function control plane device, a second media transmission path includes: obtaining an identifier of the first application function user plane edge device; and transmitting an identifier of the first application function user plane edge device to a session management function device, so that the session management function device selects a first user plane function device for the first terminal from a first available user plane function device. The first user plane function device is configured to connect the first terminal to the first application function user plane edge device. The first user plane function device is a user plane function device that has a minimum transmission delay in the first available user plane function devices, where the transmission delay is between the first user plane function device is a user plane function device and the first application function user plane edge device. The first available user plane function devices include one or more user plane function devices that can be used by the first terminal at the first location.

In one embodiment, before the determining, by first application function control plane device, a first application function user plane edge device, the method further includes: obtaining information about a service executed by the first terminal, and determining that the service is a delay sensitive service.

In one embodiment, the first application function control plane device further sends a second session initiation request to a second application function control plane device. The request includes an address of the first application function user plane anchor device for establishing a media transmission path between the first application function user plane anchor device and an application function user plane device corresponding to a second terminal. The second application function control plane device is an application function control plane device corresponding to the second terminal.

In one embodiment, the first application function control plane device further obtains a second location of the first terminal; determines a second application function user plane edge device from a second available application function user plane edge devices, where the second application function user plane edge device is an application function user plane edge device that has a minimum transmission delay in the second available application function user plane edge devices, where the transmission delay is between the second application function user plane edge device and the first terminal at the second location; and the second available application function user plane edge devices include one or more application function user plane edge devices that can be used by the first terminal at the second location; and establishes a third media transmission path and a fourth media transmission path, where the second media transmission path is used to transmit media content between the first application function user plane anchor device and the second application function user plane edge device, and the fourth media transmission path is used to transmit media content between the second application function user plane edge device and the first terminal.

In one embodiment, after determining that the third media transmission path and the fourth media transmission path are successfully established, the first application function control plane device further sends handover instruction information to the first terminal. The handover instruction information instructs the first terminal to be handed over from the first application function user plane edge device to the second application function user plane edge device, to continue to transmit the media content.

In one embodiment, the first application function control plane device further releases the first application function user plane edge device and/or releases the first user plane function device.

One embodiment of this application provides an application function control plane device. The device includes a processor and a memory. The memory is configured to store a program instruction. The processor is configured to invoke and execute the program instruction stored in the memory, to enable the application function control plane device to perform the method for managing a media transmission path according to the first aspect.

One embodiment of this application provides a computer-readable storage medium, including an instruction. When the instruction is run on a computer, the computer is enabled to perform the method for managing a media transmission path according to the first aspect.

DESCRIPTION OF EMBODIMENTS

The following describes technical solutions in embodiments of this application with reference to the accompanying drawings in the embodiments of this application.

Figure 1:
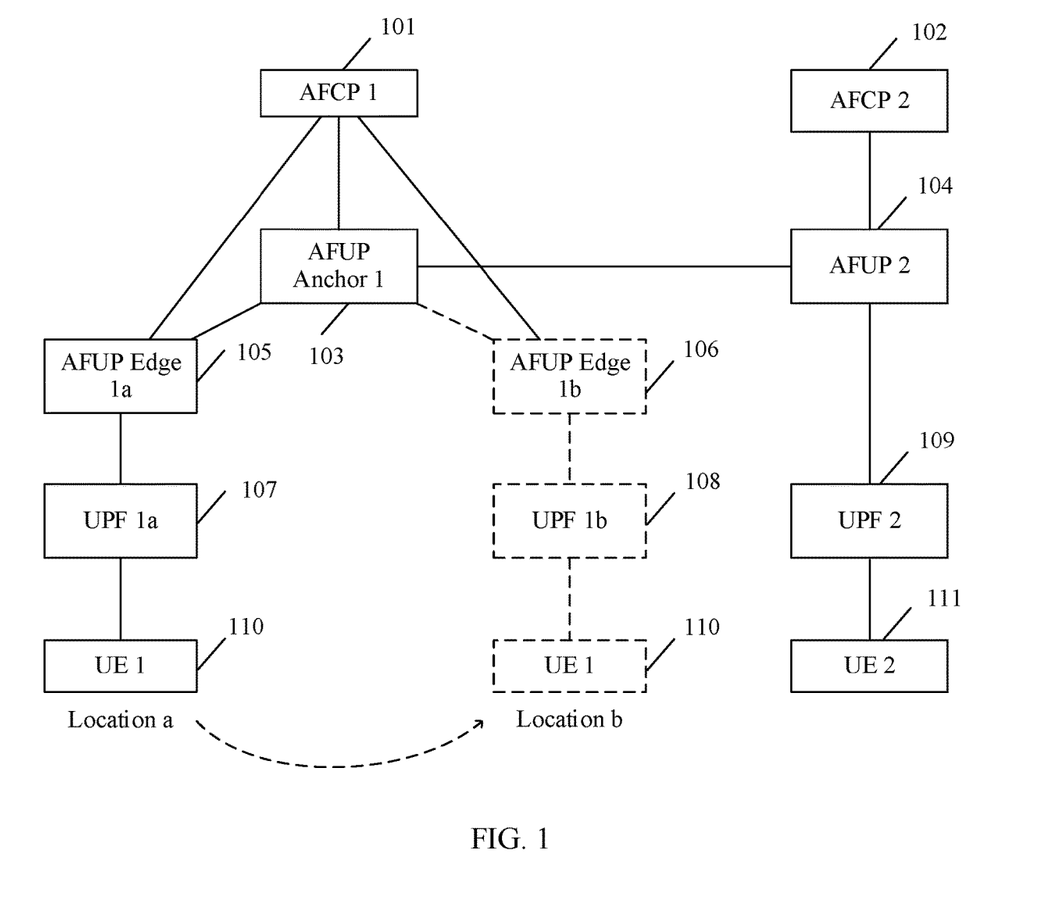
FIG. 1 is a schematic architectural diagram of managing a media transmission path according to an embodiment of this disclosure.

FIG. 1 is a schematic architectural diagram of managing a media transmission path according to an embodiment of this disclosure, including an application function control plane (AFCP) device 101 (namely, AFCP 1), an application function control plane device 102 (namely, AFCP 2), an application function user plane anchor (application function user plane anchor, AFUP Anchor) device 103 (namely, AFUP Anchor 1), and an application function user plane (application function user plane, AFUP) device 104 (namely, AFUP 2), an application function user plane edge device (application function user plane edge, AFUP Edge) device 105 (namely, AFUP Edge 1a), an application function user plane edge device 106 (namely, AFUP Edge 1b), a user plane function device (UPF) 107 (namely, UPF 1a), and a user plane function device 108 (namely, UPF 1b), a user plane function device 109 (namely, the UPF 2), a terminal 110 (namely, UE 1), and a terminal 111 (namely, the UE 2). Functions of them are described as follows.

The AFCP 1 101 is configured to: determine the AFUP Anchor 1 103, the AFUP Edge 1a 105 or the AFUP Edge 1b 106 for the UE 1 110; trigger to establish a bearer between the UE 1 110 and the UPF 1a 107, or between the UE 1 110 and the UPF 1b 108, or between the UPF 1a 107 and the AFUP Edge 1a 105, or between the UPF 1b 108 and the AFUP Edge 1b 106, or between the AFUP Edge 1a 105 and the AFUP Anchor 1 103, or between the AFUP Edge 1b 106 and the AFUP Anchor 1 103; and trigger to establish a bearer between the AFUP Anchor 1 103 and the AFUP 2 104, to form a media transmission path between the UE 1 and the UE 2. Therefore, media content may be transmitted between the UE 1 and the UE 2.

It should be uniformly noted that, in this embodiment of this disclosure, the media content transmission may be that media content of the UE 1 is transmitted, or media content of the UE 2 is transmitted. Details are not described again. The "transmission" may be sending media content or receiving media content.

Optionally, the AFCP may be a proxy-call session control function (P-CSCF) device.

The AFCP 2 102 is configured to: determine the AFUP 2 104 for the UE 2 111, and trigger to establish a bearer between the AFUP Anchor 1 103 and the AFUP 2 104, to form a media transmission path.

The AFUP Anchor 1 103 is configured to transmit media content between the AFUP 2 104 and the AFUP Edge 1a/AFUP Edge 1b. For example, the AFUP Anchor 1 103 receives media content of the UE 2 111 from the AFUP 2 104, and synchronously provides the media content for AFUP Edge 1a 105 or AFUP Edge 1b 106. When a location of UE changes, a same AFUP Anchor may be used. In this way, terminals of both communication parties are not affected by a location change of the UE, and this improves user experience.

Optionally, the AFUP Anchor may be an IP multimedia subsystem access gateway (IMS-AGW).

The AFUP 2 104 is configured to transmit media content between the AFUP Anchor 1 103 and the UPF 2 109. For example, the AFUP 2 104 receives media content of the UE 2 111 from the UPF 2 109, and provides the media content for the AFUP Anchor 1 103.

The AFUP Edge 1a 105 is an application function user plane edge device that corresponds to the UE 1 110 at a location a. There is a minimum delay between the AFUP Edge 1a 105 and the UE 1 at the location a. The AFUP Edge 1a is configured to transmit media content between the AFUP Anchor 1 103 and the UPF 1a 107. For example, the AFUP Edge 1a synchronously obtains the media content of the UE 2 111 from the AFUP Anchor 1 103, and provides the media content for the UPF 1a 107. When the location of the UE changes, the AFUP Edge 1a is switched to AFUP Edge 1b. In this way, the impact of the location change on the transmission delay can be eliminated.

Optionally, the AFUP Edge may be an IP multimedia subsystem access gateway (IMS-AGW).

The AFUP Edge 1b 106 is an application function user plane edge device that corresponds to the UE 1 110 at a location b. There is a minimum delay between the AFUP Edge 1b 106 and the UE 1 at the location b. The AFUP Edge 1b is configured to transmit media content between the AFUP Anchor 1 103 and the UPF 1b 108. For example, the AFUP Edge 1b synchronously obtains the media content of the UE 2 111 from the AFUP Anchor 1 103, and provides the media content for the UPF 1b 108.

The UPF 1a 107 is a user plane function device that corresponds to the UE 1 110 at the location a. There is a minimum delay between the UPF 1a 107 and the UE 1 110. The UPF 1a is configured to transmit media content between the AFUP Edge 1a 105 and the UE 1 110. For example, the UPF 1a synchronously obtains the media content of the UE 2 111 from the AFUP Edge 1a 105, and provides the media content for the UE 1 110.

The UPF 1b 108 is a user plane function device that corresponds to the UE 1 110 at the location b. There is a minimum delay between the UPF 1b 108 and the UE 1 110. The UPF 1b is configured to transmit media content between the AFUP Edge 1b 106 and the UE 1 110. For example, the UPF 1b synchronously obtains the media content of the UE 2 111 from the AFUP Edge 1b 106, and provides the media content for the UE 1 110.

The UPF 2 109 is configured to transmit media content between the AFUP 2 104 and the UE 2 111. For example, the UPF 2 receives the media content from the UE 2 111 and provides the media content for the AFUP 2 104.

The UE 1 110 is configured to transmit media content, including sending the media content or receiving and presenting the media content. For example, the UE 1 receives and presents the media content of the UE 2 111 from the UPF 1a 107 or the UPF 1b 108.

The UE 2 111 is configured to transmit media content, including sending the media content or receiving and presenting the media content. For example, the UE 2 provides the media content for the UPF 2 109.

The following further describes a technical solution for managing a media transmission path based on the architecture shown in FIG. 1, according to the embodiment of this disclosure.

Figure 2:
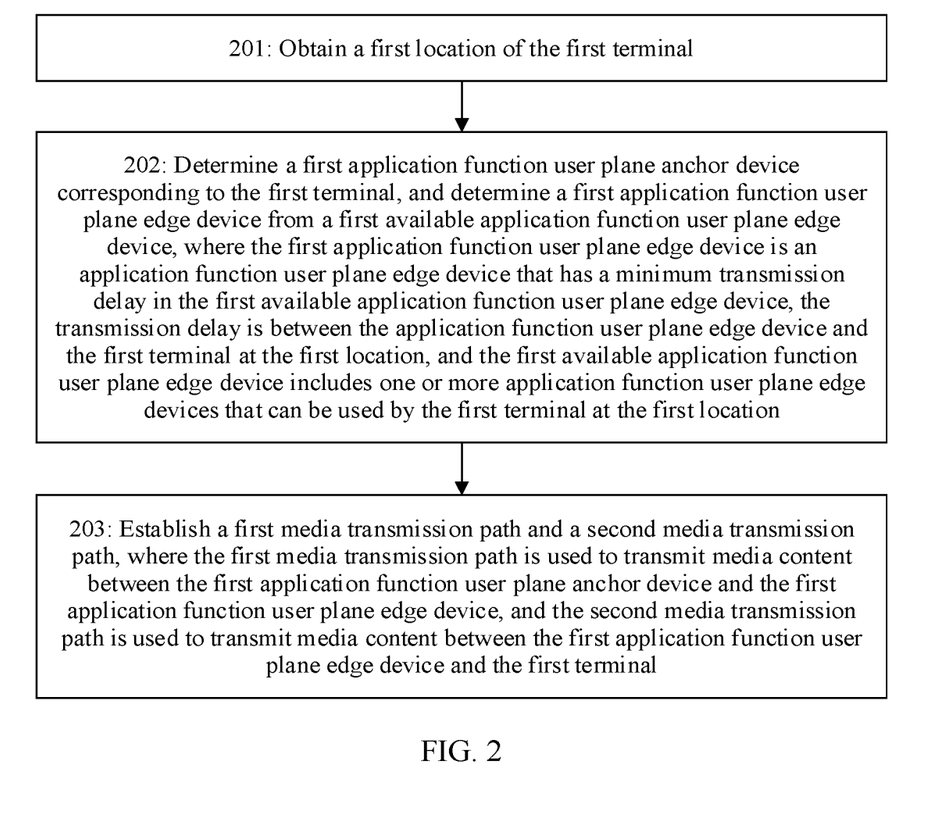
FIG. 2 is a flowchart of a method for managing a media transmission path according to an embodiment of this disclosure.

FIG. 2 is a flowchart of a method for managing a media transmission path according to an embodiment of this disclosure. An application function control plane device manages a transmission path for transmitting media content from a second terminal to a first terminal. A managing process of the transmission path includes the following blocks.

Block 201: The application function control plane device obtains first location information of the first terminal.

Optionally, the application function control plane device may obtain the first location information of the first terminal from a message (for example, a SIP-Invite message) sent by the first terminal to the application function control plane device.

Optionally, the application function control plane device may further obtain the first location information of the first terminal through a policy control device.

Block 202: Determine a first application function user plane anchor device corresponding to the first terminal, and determine a first application function user plane edge device from first available application function user plane edge devices, where the first application function user plane edge device is an application function user plane edge device that has a minimum transmission delay in the first available application function user plane edge devices, where the transmission delay is between the first application function user plane edge device and the first terminal at the first location, and the first available application function user plane edge devices include one or more application function user plane edge devices that can be used by the first terminal at the first location.

Optionally, the application function control plane device determines, from the first available application function user plane edge devices, an application function user plane edge device whose physical location is closest to the first location as the first application function user plane edge device.

Optionally, the application function control plane device determines, from the first available application function user plane edge devices, an application function user plane edge device having a maximum transmission bandwidth as the first application function user plane edge device, where the transmission bandwidth is between the application function user plane edge device and the first terminal.

Optionally, the application function control plane device determines, from the first available application function user plane edge devices, an application function user plane edge device with the lightest load as the first application function user plane edge device.

Optionally, when the first available application function user plane edge devices include only a single application function user plane edge device, the single application function user plane edge device is an application function user plane edge device that has a minimum transmission delay, where the transmission delay is between the application function user plane edge device and the first terminal at the first location.

Optionally, the application function control plane device further obtains information about a service executed by the first terminal, and after determining that the service is a delay sensitive service, determines the first application function user plane anchor device and the first application function user plane edge device.

Block 203: The application function control plane device establishes a first media transmission path and a second media transmission path, where the first media transmission path is used to transmit media content between the first application function user plane anchor device and the first application function user plane edge device, and the second media transmission path is used to transmit media content between the first application function user plane edge device and the first terminal.

Specifically, that the application function control plane device establishes the first media transmission path includes: separately sending a bearer establishment request to the first application function user plane anchor device and the first application function user plane edge device, to establish a bearer between the first application function user plane edge device and the first application function user plane anchor device, where the bearer is used to transmit media content.

Specifically, that the application function control plane device establishes the second media transmission path includes: obtaining an identifier of the first application function user plane edge device (for example, obtaining the identifier in a process of establishing the first transmission media transmission path); and transmitting an identifier of the first application function user plane edge device to a session management function device, so that the session management function device selects a first user plane function device for the first terminal from a first available user plane function device. The first user plane function device is a user plane function device that has a minimum transmission delay in the first available user plane function device, where the transmission delay is between the first user plane function device is a user plane function device and the first application function user plane edge device. Therefore, the terminal may be triggered to establish a radio bearer and a packet core network bearer through the first user plane function device. The bearers are used to transmit media content. The first available user plane function device includes one or more user plane function devices that can be used by the first terminal at the first location.

After the first media transmission path and the second media transmission path are established, the application function control plane device interacts with an application function control plane device of a second client side. A media transmission path between the second client and the application function user plane device of the second client and a media transmission path between the application function user plane device of the second client and the first application function user plane anchor device are further established, so that a media transmission path between the second terminal and the first terminal is established.

Because a terminal location factor is considered when the first application function user plane edge device is selected in the block 202, it is ensured that a transmission delay between the first application function user plane edge device and the first terminal is minimized, and thus a transmission delay between the application function user plane anchor device and the first terminal is minimized. This can better meet a low delay requirement of a delay sensitive service.

Optionally, when the first terminal moves to a second location, the application function control plane device further obtains second location information, and determines a second application function user plane edge device from second available application function user plane edge devices according to the second location information. The second application function user plane edge device is an application function user plane edge device that has a minimum transmission delay in the second available application function user plane edge devices, where the transmission delay is between the second application function user plane edge device and the first terminal at the second location. The second available application function user plane edge devices include one or more application function user plane edge devices that can be used by the first terminal at the second location. The application function control plane device establishes a third media transmission path and a fourth media transmission path, where the second media transmission path is used to transmit media content between the first application function user plane anchor device and the second application function user plane edge device, and the fourth media transmission path is used to transmit media content between the second application function user plane edge device and the first terminal. Optionally, the application function control plane device may subscribe to location information of the first terminal from the policy control device, so that when the location information of the first terminal changes, the second application function user plane edge device is determined in time and a new media transmission path is established.

Because the application function control plane device can switch to a low delay transmission path in time when the location of the terminal changes, a low delay requirement of a delay sensitive service is further met.

Figure 3:
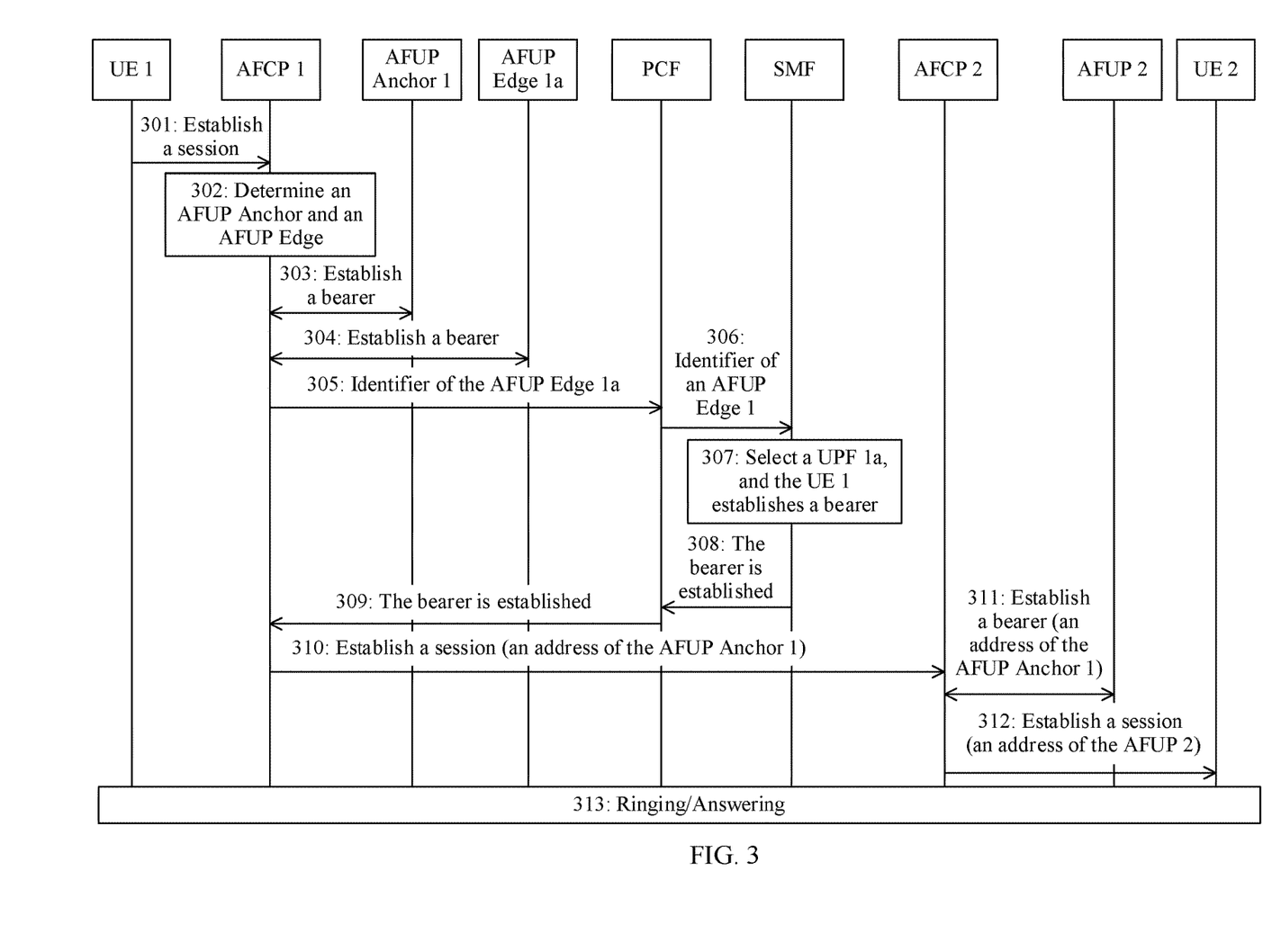
FIG. 3 is a flowchart of a method for managing a media transmission path according to an embodiment of this disclosure.

FIG. 3 is a flowchart of a method for managing a media transmission path according to an embodiment of this disclosure. UE 1 prepares to perform a VR video call with UE 2. In a process of establishing a media transmission path, an AFCP can select an AFUP Edge having a minimum transmission delay according to a location of the UE 1, to better meet a transmission delay requirement of the VR video call. The method specifically includes the following blocks.

Block 301: The UE 1 sends a session establishment request to an AFCP 1.

Specifically, the UE 1 sends a session initiation protocol-invite (SIP-Invite) message to the AFCP 1. The SIP-Invite message is used to request to establish a media transmission path with the UE 2, to obtain media content from the UE 2 through the transmission path. The SIP-Invite message includes current location information (first location information) of the UE 1 and an identifier of the UE 2. Optionally, the SIP-Invite message further includes service information of the UE 1 (the service information is information about a service to be executed by the UE 1 over the media transmission path), and the AFCP 1 determines whether the service is a delay sensitive service according to the service information.

Block 302: The AFCP 1 determines an AFUP Anchor and an AFUP Edge.

Specifically, after receiving and parsing the SIP-Invite message in block 301, the AFCP 1 determines an application function user plane anchor device AFUP Anchor 1 corresponding to the UE 1, and determines, according to the location information of the UE 1, an application function user plane edge device AFUP Edge 1a that has a minimum transmission delay, where the transmission delay is between the application function user plane edge device AFUP Edge 1a and the first terminal. The AFUP Anchor 1 is configured to transmit media content between the AFUP Edge 1a and an AFUP (an AFUP 2) of the UE 2 side. For example, the AFUP Anchor 1 receives media content from the AFUP 2, and synchronously provides the media content for the AFUP Edge 1a. The AFUP Edge 1a synchronously obtains the media content from the AFUP Anchor 1 and synchronously provides the media content for the UE 1.

The AFCP 1 may first determine a plurality of available AFUP Edges, and then select, from the plurality of available AFUP Edges, an application function user plane edge device that has a minimum transmission delay as the AFUP Edge 1a, where the transmission delay is between the application function user plane edge device and the first terminal. For example, the AFCP 1 first determines an AFUP Edge 1, an AFUP Edge 2, and an AFUP Edge 3 that are available to the UE 1 at the first location, then compares delays between each AFUP Edges and the UE1 to obtain an application function user plane edge device that has a minimum delay, where the delay is between the application function user plane edge device and the UE 1, and determines the application function user plane edge device as the AFUP Edge 1*a*.

Optionally, the AFCP 1 may select or determine, from the plurality of available AFUP Edges, an application function user plane edge device closest to the first location as the AFUP Edge 1*a*. Alternatively, the AFCP 1 may select or determine, from the plurality of available AFUP Edges, an application function user plane edge device with a maximum bandwidth to the UE 1 as the AFUP Edge 1*a*. The AFCP 1 may further select or determine, from the plurality of available AFUP Edges, an application function user plane edge device with the lightest load as the AFUP Edge 1*a*.

When the AFCP 1 determines that there is only one AFUP Edge (for example, AFUP Edge One) that can be used by the UE 1 at the first location, an application function user plane edge device AFUP Edge 1*a* that has a minimum transmission delay is the AFUP Edge (for example, AFUP Edge One), where the transmission delay is between the application function user plane edge device AFUP Edge 1*a* and the first terminal.

When an AFUP Edge that is selected from the plurality of available AFUP Edges and that has a minimum delay is unavailable (for example, due to an insufficient computer running resource), where the delay is between the AFUP Edge and the UE 1, an AFUP Edge having a second minimum delay may be selected, where the delay is between the AFUP Edge and the UE 1. For example, among the AFUP Edge 1, the AFUP Edge2, and the AFUP Edge3, when the AFUP Edge2 has a minimum delay, but a computer running resource of which is insufficient, and the AFUP Edge1 has a second minimum delay (larger than the AFUP Edge2 but smaller than the AFUP Edge3), the AFUP Edge1 may be selected as the AFUP Edge 1*a*. Similarly, an AFUP Edge may be selected from AFUP Edges with different delays as the AFUP Edge 1*a*.

Optionally, the AFCP 1 determines, according to the information about the service to be executed by the UE 1, whether the service to be executed by the UE 1 is a delay sensitive service. If the service to be executed by the UE 1 is a delay sensitive service, the AFCP 1 determines the AFUP Edge 1*a* for the UE 1.

Because the UE 1 is a mobile terminal, and a location of which may change at any time, to ensure a relatively low delay of a media transmission path, the AFCP 1 may subscribe to a location change event of the UE 1 from a policy control function (PCF) in this block, to re-determine an AFUP Edge for the UE 1 when the location of the UE 1 changes. For details, reference may be made to the description in the embodiment.

Block 303: The AFCP 1 instructs the AFUP Anchor 1 to establish a bearer.

Specifically, the AFCP 1 sends a bearer establishment request message to the AFUP Anchor 1, and obtains an IP address and a port of the AFUP Anchor 1 from a bearer establishment response message. The IP address and the port are used to further establish a bearer or a media transmission path.

Block 304: The AFCP 1 instructs the AFUP Edge 1*a* to establish a bearer.

Specifically, the AFCP 1 sends a bearer establishment request to the AFUP Edge 1*a*, where the request includes the IP address and the port of the AFUP Anchor 1. After obtaining the IP address and the port of the AFUP Anchor 1, the AFUP Edge 1*a* establishes a bearer with the AFUP Anchor 1 as a media transmission path. The AFUP Edge 1*a* returns a bearer establishment response message to the AFP 1. The response message includes the IP address and the port that are used by the AFUP Edge 1*a* to further establish the media transmission path.

It should be noted that the block 303 and the block 304 may be exchanged. In this case, the IP address and the port of the AFUP Edge 1*a* should be first obtained, and then the IP address and the port of the AFUP Edge 1*a* are included in the bearer establishment request message sent to the AFUP Anchor 1.

Block 305: The AFCP 1 sends an identifier of the AFUP Edge 1*a* to the PCF.

The AFCP 1 sends the identifier of the AFUP Edge 1*a* to the PCF, and the PCF sends the identifier of the AFUP Edge 1*a* to a session management function (SMF).

Optionally, the AFCP 1 sends an authentication authorization request (AAR) including the identifier of the AFUP Edge 1*a* to the PCF.

Optionally, the identifier of the AFUP Edge 1*a* may be in a form of a data network access identifier (DNAI).

Block 306: The PCF sends the identifier of the AFUP Edge 1*a* to the SMF.

The PCF sends the identifier of the AFUP Edge 1*a* to the SMF, and the SMF selects a UPF for the UE 1 based on the identifier of the AFUP Edge 1*a*.

Optionally, the PCF sends a re-authentication request (RAR) including the identifier of the AFUP Edge 1*a* to the SMF.

Block 307: The SMF selects a UPF 1*a*, and the UE 1 establishes a bearer.

Specifically, the SMF selects a corresponding UPF (there is a minimum media delay between the UPF and the AFUP Edge 1*a*, for example, the UPF 1*a*) according to the identifier (in a DNAI form) of the AFUP Edge 1*a* and the location of the UE 1 (the SMF may obtain the location information of the UE 1 from the SMF), and triggers the UE 1 to establish a radio bearer and a packet switched bearer. The radio bearer is a radio bearer of the UE 1 in a wireless network to which the UE 1 is located, and the packet switched bearer is a packet switched bearer of the UE 1 in a packet switched network in which the UPF 1*a* is located. The radio bearer and the packet switched bearer are used as media transmission paths.

Similar to the block 302, the SMF may first determine a plurality of available UPFs, and then select or determine a UPF that has a minimum delay from the plurality of available UPFs, where the delay is between the UPF and the AFUP Edge 1*a*. For example, the SMF first determines a UPFx, a UPFy, and a UPFz that are available UPFs, then compares delays between each AFUP Edges and the UE1 to obtain a UPF that has a minimum delay, where the delay is between the UPF and the AFUP Edge1*a*, and determines the UPF as the UPF 1*a*.

Block 308: The SMF notifies the PCF that the bearer is established.

Specifically, the SMF notifies the PCF that the radio bearer and the packet switched bearer of the UE 1 are established.

Optionally, the SMF sends to the PCF the credit control request (CCR) including information indicating that the radio bearer and the packet switched bearer are established.

Block 309: The PCF notifies the AFCP 1 that the radio bearer and the packet switched bearer are established.

Optionally, the PCF sends an RAR including information indicating that the radio bearer and the packet switched bearer are established to the AFCP 1.

Block 310: The AFCP 1 sends a session establishment request to an AFCP 2, where the request includes the address of the AFUP Anchor 1.

Specifically, the AFCP 1 determines, according to the identifier of the UE 2 (obtained from the SIP-Invite message sent by the UE 1 in block 301), the application function control plane device AFCP 2 corresponding to the UE 2, and sends the SIP-Invite message to the AFCP 2. The SIP-Invite message includes the address of the AFUP Anchor 1.

Block 311: The AFCP 2 instructs the AFUP 2 to establish a bearer request, where the request includes the address of the AFUP Anchor 1.

Specifically, the AFCP 2 determines a corresponding application function user plane device AFUP 2 of the UE 2 side, and sends a bearer establishment request to the AFUP 2, where the request includes the address of the AFUP Anchor 1 for establishing a bearer between the AFUP 2 and the AFUP Anchor 1 as a media transmission path.

The AFCP 2 further obtains an address of the AFUP 2 from a bearer establishment response message returned by the AFUP 2.

Block 312: The AFCP 2 sends a session establishment request to the UE 2, where the request includes the address of the AFUP 2.

Specifically, the AFCP 2 sends a SIP-Invite message to the UE 2, and the SIP-Invite message includes the address of the AFUP 2, so that the UE 2 may establish a session with the AFUP 2 as a media transmission path.

So far, all of the media transmission paths between the UE 2 and the UE 1 are established, including the media transmission path between the UE 2 and the AFUP 2, the media transmission path between the AFUP 2 and the AFUP Anchor 1, the media transmission path between the AFUP Anchor 1 and the AFUP Edge 1a, and the media transmission path between the AFUP Edge 1a and the UE 1.

Block 313: The UE 1 and the UE 2 ring/answer each other.

Specifically, through the established media transmission paths, a ringing/answer process is performed between the UE 1 and the UE 2, and media content, for example, VR video content and AR video content are transmitted.

In the Embodiment 3, the AFCP can select an AFUP Edge having a minimum delay based on location information of the terminal. This effectively reduces the transmission delay between the terminal and the AFUP Anchor, and better meets a low delay requirement of a delay sensitive service.

Figure 4:
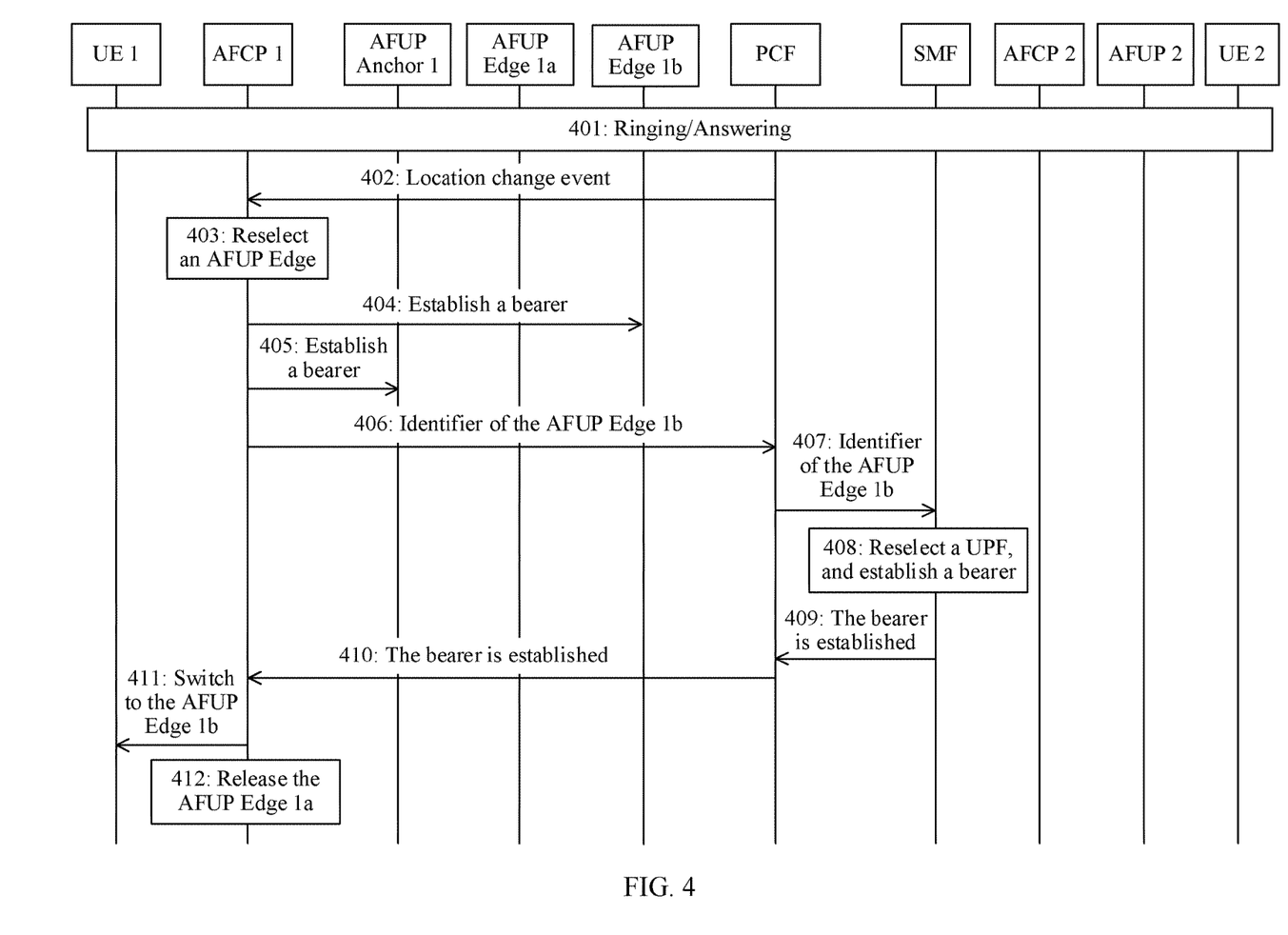
FIG. 4 is a flowchart of a method for managing a media transmission path according to an embodiment of this disclosure.

FIG. 4 is a flowchart of a method for managing a media transmission path according to an embodiment of this disclosure. UE 1 is performing a VR video call with UE 2. When a location of a terminal changes, an AFCP can reselect an AFUP Edge having a minimum transmission delay for the terminal, and instruct the terminal to switch to a new AFUP Edge, to meet a requirement of the VR video call for a transmission delay. The method includes the following blocks.

Block 401: The UE 1 and the UE 2 ring/answer each other.

This block is the same as the description in the block 313.

Block 402: The AFCP 1 receives a location change event of the UE 1 from a PCF.

The AFCP 1 receives the location change event of the UE 1 from the PCF (the location change event includes new location information of the UE 1, for example, second location information), and determines that a location of the UE 1 is changed. Optionally, the AFCP 1 receives the location change event in an RAR message.

For example, when the UE 1 moves from one base station to another base station, or enters another city from an edge of one city, the AFCP 1 receives the location change event from the PCF.

If a previous media transmission path is maintained after the location moves, the media transmission delay may increase.

It should be noted that, as described in the block 301 in Embodiment 3 that the AFCP 1 subscribes to the location change event of the UE 1 from the PCF, the AFCP 1 should subscribe to the location change event of the UE 1 from the PCF in advance.

Block 403: The AFCP 1 reselects an AFUP Edge.

The AFCP 1 reselects an AFUP Edge 1b as the AFUP Edge according to the new location information of the UE 1, where there is a minimum transmission delay between the AFUP Edge 1b and the UE 1 at the new location. For a specific process, refer to the description in the block 302.

Block 404: The AFCP 1 instructs the AFUP Edge 1a to establish a bearer.

This block is similar to the block 304.

Block 405: The AFCP 1 instructs the AFUP Edge 1b to establish a bearer.

This block is similar to the block 303.

Block 406: The AFCP 1 sends an identifier of the AFUP Edge 1b to the PCF.

This block is similar to the block 305.

Block 407: The PCF sends the identifier of the AFUP Edge 1b to the SMF.

This block is similar to the block 306.

Block 408: The SMF reselects a UPF, and the UE 1 establishes a bearer.

This block is similar to the block 307.

Block 409: The SMF notifies the PCF that the bearer is established.

This block is similar to the block 308.

Block 410: The PCF notifies the AFCP 1 that the bearer is established.

This block is similar to the block 309.

Block 411: The AFCP 1 instructs the UE 1 to switch to the AFUP Edge 1b.

Specifically, the AFCP 1 sends a SIP-Reinvite message to the UE 1, and the SIP-Reinvite message includes an address of the AFUP Edge 1b, so that the UE 1 may switch to the AFUP Edge 1b and obtain media content of the UE 2 from the AFUP Edge 1b.

Block 412: The AFCP 1 releases the AFUP Edge 1a.

Because the UE 1 is handed over to a coverage area of the AFUP Edge 1b, the AFUP Edge 1a may be released to save resources. Specifically, if the IP address of the UE 1 does not change, the bearer between the UE 1 and the AFUP Edge 1a is directly disconnected. If the IP address of the UE 1 changes, an IMS deregistration procedure should be initiated, and the bearer between the UE 1 and the AFUP Edge 1a is disconnected.

Specifically, the AFCP 1 may determine, according to information about two IMS registrations initiated by the UE 1 (IP addresses used in the two registrations are different), whether the deregistration procedure should be initiated for the UE 1. After the IMS deregistration procedure is initiated for the UE 1, the AFCP 1 initiates a procedure for disconnecting the bearer between the UE 1 and the AFUP Edge 1a.

Optionally, the AFCP 1 further instructs the SMF (an instruction is forwarded by the PCF) to release the UPF 1a.

In the Embodiment 4, when the location of the terminal changes, the AFCP may reselect an AFUP Edge having a minimum delay, so that when the terminal moves, the terminal can still maintain a low transmission delay between the terminal and the AFUP Anchor, to better meet a low delay requirement of a delay sensitive service.

Figure 5:
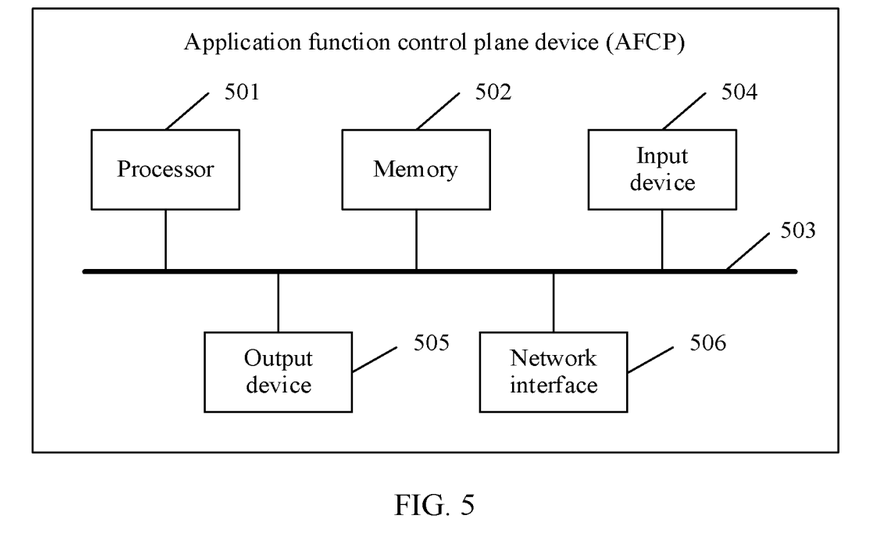
FIG. 5 is a structural diagram of hardware of an application function control plane device according to an embodiment of this disclosure.

FIG. 5 is a structural diagram of hardware of an application function control plane device according to an embodiment of this disclosure.

A general-purpose computer shown in FIG. 5 may be the application function control plane device in FIG. 1. The application function control plane device may use general-purpose computer hardware including a processor 501, a memory 502, a bus 503, an input device 504, an output device 505, and a network interface 506.

Specifically, the memory 502 may include a computer storage medium in a form of a volatile and/or nonvolatile memory, such as a read-only memory and/or a random access memory. The memory 502 can store an operating system, an application program, another program module, executable code, and program data.

The input device 504 may be configured to input information, and a system administrator can operate and manage the device through the input device 504, for example, configuring different services to be delay sensitive services. The input device 504 may be a keyboard, a pointing device, a mouse, a trackball, a touchpad, a microphone, a joystick, a game pad, a satellite TV antenna, a scanner or similar equipment, and the like. These input devices may be connected to the processor 501 through the bus 503.

The output device 505 may be configured to output information, and the system administrator can operate and manage the device through the output device 505. In addition to a monitor, the output device 505 may be another peripheral output device, such as a speaker and/or a printer. These output devices may also be connected to the processor 501 through the bus 503.

The application function control plane device may be connected to a network through the network interface 506, for example, connected to a local area network (LAN). In a network connection environment, a computer execution instruction stored in the application function control plane device can be stored in a remote storage device, and is not limited to being locally stored.

When the processor 501 in the application function control plane device executes the executable code or the application program stored in the memory 502, the application function control plane device is enabled to perform method blocks for the application function control plane device side in the Embodiment 1 to the Embodiment 4, for example, perform blocks 202 and 302. For a specific execution process, refer to the Embodiment 1 to the Embodiment 4, and details are not described herein again.

Figure 6:
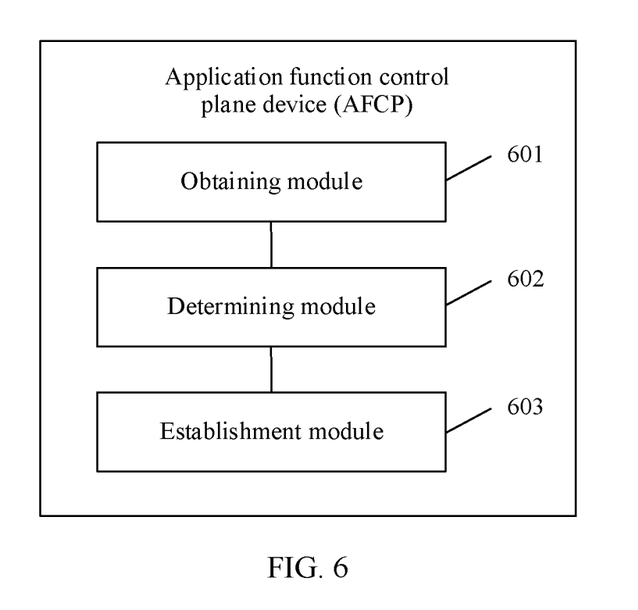
FIG. 6 is a schematic structural diagram of an application function control plane device according to an embodiment of this disclosure.

This embodiment provides a schematic structural diagram of an application function control plane device, as shown in FIG. 6. The application function control plane device includes:

an obtaining module 601. The obtaining module 601 is configured to obtain location information of a first terminal. For a specific execution process, refer to the descriptions of the blocks for the application function control plane device side in the Embodiment 1 to the Embodiment 4. For example, refer to the block 201 and the block 301;

Optionally, the obtaining module 601 may obtain a first location information of the first terminal from a message (for example, a SIP-Invite message) sent by the first terminal to the application function control plane device.

Optionally, the obtaining module 601 may further obtain the first location information of the first terminal through a policy control device.

a determining module 602. The determining module 602 is configured to determine a first application function user plane anchor device corresponding to the first terminal, and determine a first application function user plane edge device from first available application function user plane edge devices. The first application function user plane edge device is an application function user plane edge device that has a minimum transmission delay in the first available application function user plane edge devices, where the transmission delay is between the first application function user plane edge device and the first terminal at the first location. The first available application function user plane edge devices include one or more application function user plane edge devices that can be used by the first terminal at the first location. For a specific execution process, refer to the descriptions of the blocks for the application function control plane device side in the Embodiment 1 to the Embodiment 4. For example, refer to the block 202 and the block 302.

Optionally, the determining module 602 determines, from the first available application function user plane edge devices, an application function user plane edge device whose physical location is closest to the first location as the first application function user plane edge device.

Optionally, the determining module 602 determines, from the first available application function user plane edge devices, an application function user plane edge device having a maximum transmission bandwidth as the first application function user plane edge device, where the transmission bandwidth is between the application function user plane edge device and the first terminal.

Optionally, the determining module 602 determines, from the first available application function user plane edge devices, an application function user plane edge device with the lightest load as the first application function user plane edge device.

Optionally, the obtaining module 601 further obtains information about a service executed by the first terminal. After determining that the service is a delay sensitive service, the determining module 602 determines the first application function user plane anchor device and the first application function user plane edge device.

an establishment module 603. The establishment module 603 is configured to establish a first media transmission path and a second media transmission path. The first media transmission path is used to transmit media content of the second terminal from the first application function user plane anchor device to the first application function user plane edge device. The second media transmission path is used to transmit the media content of the second terminal from the first application function user plane edge device to the first terminal. For a specific execution process, refer to the descriptions of the blocks for the application function control plane device side in the Embodiment 1 to the Embodiment 4. For example, refer to the block 203 and the blocks 303-309.

Specifically, that the establishment module 603 establishes the first media transmission path includes: separately sending a bearer establishment request to the first application function user plane anchor device and the first application function user plane edge device, to establish a bearer between the first application function user plane edge device and the first application function user plane anchor device, where the bearer is used to transmit media content.

Specifically, that the establishment module 603 establishes the second media transmission path includes: obtaining an identifier of the first application function user plane edge device (for example, obtaining the identifier in a process of establishing the first transmission media transmission path); and transmitting an identifier of the first application function user plane edge device to a session management function device, so that the session management function device selects a first user plane function device for the first terminal from a first available user plane function device. The first user plane function device is a user plane function device that has a minimum transmission delay in the first available user plane function device, where the transmission delay is between the first user plane function device is a user plane function device and the first application function user plane edge device. Therefore, the terminal may be triggered to establish a radio bearer and a packet core network bearer through the first user plane function device. The bearers are used to transmit media content. The first available user plane function device includes one or more user plane function devices that can be used by the first terminal at the first location.

After the first media transmission path and the second media transmission path are established, the establishment module 603 interacts with an application function control plane device of a second client side. A media transmission path between the second client and the application function user plane device of the second client and a media transmission path between the application function user plane device of the second client and the first application function user plane anchor device are further established, so that a media transmission path between the second terminal and the first terminal is established.

Because a terminal location factor is considered when the determining module 602 selects the first application function user plane edge device, it is ensured that a transmission delay between the first application function user plane edge device and the first terminal is minimized, and thus a transmission delay between the application function user plane anchor device and the first terminal is minimized. This can better meet a transmission delay requirement of a delay sensitive service.

Optionally, when the first terminal moves to a second location, the obtaining module 601 further obtains second location information, and the determining module 602 determines a second application function user plane edge device from a second available application function user plane edge devices according to the second location information. The second application function user plane edge device is an application function user plane edge device that has a minimum transmission delay in the second available application function user plane edge devices, where the transmission delay is between the second application function user plane edge device and the first terminal at the second location. The second available application function user plane edge devices include one or more application function user plane edge devices that can be used by the first terminal at the second location. A third media transmission path and a fourth media transmission path is established. The second media transmission path is used to transmit media content between the first application function user plane anchor device and the second application function user plane edge device. The fourth media transmission path is used to transmit media content between the second application function user plane edge device and the first terminal.

Optionally, the obtaining module 601 may subscribe to location information of the first terminal from the policy control device, so that when the location information of first terminal changes, the second application function user plane edge device is determined in time by the determining module 602 and a new media transmission path is established.

Because the application function control plane device can switch a transmission path in time when the location of the terminal changes, support for the delay sensitive service is further ensured.

In this embodiment, the application function control plane device is presented in a form of a functional module. The "module" herein may be an application-specific integrated circuit (ASIC), a circuit, a processor and a memory for executing one or more software or firmware programs, an integrated logic circuit, and/or another device that can provide the foregoing function. In a simple embodiment, a person skilled in the art may figure out that the client may be in a form as shown in FIG. 5. Functions of the obtaining module 601 and the determining module 602 may be implemented through the processor 501 and the memory 502 in FIG. 5. For example, a function of the determining module 602 for determining the application function user plane edge device may be implemented through the processor 501 by executing the code stored in the memory 502.

A person of ordinary skill in the art may be aware that, in combination with the examples described in the embodiments disclosed in this specification, units and algorithm blocks may be implemented by electronic hardware, computer software, or a combination thereof. To clearly describe the interchangeability between the hardware and the software, the foregoing has generally described compositions and blocks of each example according to functions. Whether the functions are performed by hardware or software depends on particular applications and design constraint conditions of the technical solutions. A person skilled in the art may use a different method to implement the described functions for each particular application, but it should not be considered that the implementation goes beyond the scope of this disclosure.

It may be clearly understood by a person of ordinary skill in the art that, for ease and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the unit division is merely logical function division and may be other division in actual implementation. For example, a plurality of units or components may be combined or integrated into another system, or some features may be ignored or not performed. In addition, displayed or discussed mutual couplings or direct couplings or communication connections may be indirect couplings or communication connections using some interfaces, apparatuses, or units, and may be connections in an electrical form, a mechanical form, or another form.

The units described as separate parts may or may not be physically separate, and parts displayed as units may or may not be physical units, that is, may be located in one position, or may be distributed on a plurality of network units. Some or all of the units may be selected based on an actual requirement to achieve an objective of the solutions of the embodiments in this disclosure.

In addition, functional units in the embodiments of this disclosure may be integrated into one processing unit, or each of the units may exist alone physically, or two or more units may be integrated into one unit. The integrated units may be implemented in a form of hardware, or may be implemented in a form of a software functional unit.

When the integrated unit is implemented in the form of a software function unit and sold or used as an independent product, the integrated unit may be stored in a computer-readable storage medium. Based on such an understanding, the technical solutions of this disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the blocks of the methods described in the embodiments of this disclosure. The foregoing storage medium includes: any medium that can store program code, such as a USB flash drive, a removable hard disk, a read-only memory, a random access memory, a magnetic disk, or an optical disc.

The foregoing descriptions are merely specific embodiments of this disclosure, but are not intended to limit the protection scope of this disclosure. Any modification or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method for managing a media transmission path, applied to a first application function control plane device, comprising:
   obtaining information of a first location of a first terminal;
   determining, after obtaining the information of the first location of the first terminal, a first application function user plane edge device from first available application function user plane edge devices, wherein each of the first available application function user plane edge devices has a transmission delay between the first terminal at the first location and that first available application function user plane edge device; wherein the determined first application function user plane edge device is an application function user plane edge device that has a minimum transmission delay among the first available application function user plane edge devices; and
   triggering establishment of a media transmission path corresponding to the first location, wherein the media transmission path corresponding to the first location is used to transmit media content between the first terminal at the first location and an application function user plane anchor device associated with the first terminal and via the first application function user plane edge device;
   wherein the triggering, by the first application function control plane device, the media transmission path corresponding to the first location comprises:
   obtaining an identifier of the first application function user plane edge device; and
   transmitting the identifier of the first application function user plane edge device to a session management function device, wherein the session management function device selects a first user plane function device for the first terminal from first available user plane function devices based on the identifier for the first application function user plane edge device, wherein the first user plane function device is configured to connect the first terminal to the first application function user plane edge device, wherein the first user plane function device is a user plane function device that has a minimum transmission delay among the first available user plane function UPF devices, wherein the minimum transmission delay is between the first user plane function device and the first application function user plane edge device.

2. The method of claim 1, wherein the determining, by the first application function control plane device, the first application function user plane edge device from the first available AFUP edge devices comprises one or more of:
   determining, from the first available application function user plane edge devices, an application function user plane edge device whose physical location is closest to the first location as the first application function user plane edge device;
   determining, from the first available application function user plane edge devices, an application function user plane edge device having a maximum transmission bandwidth as the first application function user plane edge device, wherein the maximum transmission bandwidth is between the application function user plane edge device and the first terminal; or
   determining, from the first available application function user plane edge devices, an application function user plane edge device with the lightest load as the first application function user plane edge device.

3. The method of claim 1, wherein the triggering, by the first application function control plane device, the establishment of the media transmission path corresponding to the first location comprises:
   separately sending a bearer establishment request to the first application function user plane anchor device and the first application function user plane edge device.

4. The method of claim 1, wherein before the determining, by first application function control plane device, the first application function user plane edge device, the method further comprises:
   obtaining information about a service executed by the first terminal, and determining that the service is a delay sensitive service.

5. The method of claim 1, wherein the obtaining the first location of the first terminal comprises:
   obtaining the information of the first location of the first terminal in a first session initiation request from the first terminal.

6. The method of claim 1, wherein the method further comprises:
   determining the first available application function user plane edge devices.

7. The method of claim 6, wherein the method further comprises:
   obtaining information of a second location of the first terminal;
   determining, based on the information of the second location of the first terminal, a second application function user plane edge device from second available application function user plane edge devices, wherein each of the second available A application function user plane FUP edge devices has a transmission delay between the first terminal at the second location and that second available application function user plane edge device, wherein the second application function user plane edge device is an application function user plane edge device that has a minimum transmission delay among the second available application function user plane edge devices; and triggering establishment of a media transmission path corresponding to the second location, wherein the media transmission path corresponding to the second location is used to transmit media content between the first terminal at the second location and the application function user plane edge device and via the second application function user plane edge device.

8. The method of claim 7, wherein the method further comprises:

determining that the media transmission path corresponding to the second location is successfully established;

sending handover instruction information to the first terminal, wherein the handover instruction information instructs the first terminal to be handed over from the first application function user plane edge device to the second application function user plane, to continue to transmit the media content.

9. The method of claim 8, wherein the method further comprises:

releasing an application function user plane edge device and/or a user plane function device in the media transmission path corresponding to the first location.

10. The method of claim 6, wherein the method further comprises:

determining the second available application function user plane devices;

obtaining address of the application function user plane anchor device associated with the first terminal; and sending address of the application function user plane anchor device associated with the first terminal to an application function control plane device corresponding to a second terminal, so as to trigger establishment of a media transmission path between the application function user plane anchor device associated with the first terminal and an application function user plane corresponding to the second terminal.

11. The method of claim 6, wherein the method further comprises:

determining the second application function user plane edge devices.

12. An application function control plane device, comprising:

a processor; and a memory;

wherein the memory is configured to store program instructions, which, when executed by the processor, cause the application function control plane device to perform operations comprising:

obtaining information of a first location of a first terminal;

determining, after obtaining the information of the first location of the first terminal, a first application function user plane edge device from first available application function user plane edge devices, wherein each of the first available application function user plane edge devices has a transmission delay between the first terminal at the first location and that first available application function user plane edge device; wherein the determined first application function user plane edge device is an application function user plane edge device that has a minimum transmission delay among the first available application function user plane edge devices; and triggering establishment of a media transmission path corresponding to the first location, wherein the media transmission path corresponding to the first location is used to transmit media content between the first terminal at the first location and an application function user plane anchor device associated with the first terminal and via the first application function user plane edge device;

wherein the triggering, by the first application function control plane device, the media transmission path corresponding to the first location comprises:

obtaining an identifier of the first application function user plane edge device; and transmitting the identifier of the first application function user plane edge device to a session management function device, wherein the session management function device selects a first user plane function device for the first terminal from first available user plane function devices based on the identifier for the first application function user plane edge device, wherein the first user plane function device is configured to connect the first terminal to the first application function user plane edge device, wherein the first user plane function device is a user plane function device that has a minimum transmission delay among the first available user plane function devices, wherein the minimum transmission delay is between the first user plane function device and the first application function user plane edge device.

13. The application function control plane device of claim 12, wherein the determining, by the first application function control plane device, the first application function user plane edge device from the first available application function user plane edge devices comprises one or more of:

determining, from the first available application function user plane edge devices, an application function user plane edge device whose physical location is closest to the first location as the first application function user plane edge device;

determining, from the first available application function user plane edge devices, an application function user plane edge device having a maximum transmission bandwidth as the first application function user plane edge device, wherein the maximum transmission bandwidth is between the application function user plane edge device and the first terminal; or determining, from the first available application function user plane edge devices, an application function user plane edge device with the lightest load as the first application function user plane edge device.

14. The application function control plane device of claim 12, wherein the triggering, by the first application function control plane device, the establishment of the media transmission path corresponding to the first location comprises:

separately sending a bearer establishment request to the first application function user plane anchor device and the first application function user plane edge device.

15. The application function control plane device of claim 12, wherein before the determining, by first application function control plane device, the first application function user plane edge device, the method further comprises:

obtaining information about a service executed by the first terminal, and determine that the service is a delay sensitive service.

16. The application function control plane device of claim 12, wherein the obtaining the first location of the first terminal comprises: determining the first available application function user plane edge devices.

17. A communication system, comprising:
at least one application function control plane device;
at least one application function control plane anchor device; and
at least one application function user plane edge device;
wherein each of the at least one application function control plane device is configured to perform operations comprising:
obtaining information of a first location of a first terminal;
determining, after obtaining the information of the first location of the first terminal, a first application function user plane edge device from first available application function user plane edge devices; wherein the determined first application function user plane edge device is an application function user plane edge device that has a minimum transmission delay among the first available application function user plane edge devices; and
trigger establishment of a media transmission path corresponding to the first location, wherein the media transmission path corresponding to the first location is used to transmit media content between the first terminal at the first location and an application function user plane anchor device associated with the first terminal and via the first application function user plane edge device;
wherein the triggering, by the first application function control plane device, the media transmission path corresponding to the first location comprises:
obtaining an identifier of the first application function user plane edge device; and
transmitting the identifier of the first application function user plane edge device to a session management function device, wherein the session management function device selects a first user plane function device for the first terminal from first available user plane function devices based on the identifier for the first application function user plane edge device, wherein the first user plane function device is configured to connect the first terminal to the first application function user plane edge device, wherein the first user plane function device is a user plane function device that has a minimum transmission delay among the first available user plane function UPF devices, wherein the minimum transmission delay is between the first user plane function device and the first application function user plane edge device.

18. The communication system of claim 17, wherein the determining, by the first application function control plane device, the first application function user plane edge device from the first available application function user plane edge devices comprises one or more of:
determining, from the first available application function user plane edge devices, an application function user plane edge device whose physical location is closest to the first location as the first application function user plane edge device;
determining, from the first available application function user plane edge devices, an application function user plane edge device having a maximum transmission bandwidth as the first application function user plane edge device, wherein the maximum transmission bandwidth is between the application function user plane edge device and the first terminal; or
determining, from the first available application function user plane edge devices, an application function user plane edge device with the lightest load as the first application function user plane edge device.

* * * * *

UNITED STATES PATENT AND TRADEMARK OFFICE
CERTIFICATE OF CORRECTION

PATENT NO. : 11,700,284 B2
APPLICATION NO. : 16/990773
DATED : July 11, 2023
INVENTOR(S) : Biao Zhang and Yongge Xue It is certified that error appears in the above-identified patent and that said Letters Patent is hereby corrected as shown below:

In the Claims

In Claim 1, Column 18, Line 7, delete "UPF".

In Claim 17, Column 22, Line 9, delete "UPF".

Signed and Sealed this
Tenth Day of October, 2023

Katherine Kelly Vidal
*Director of the United States Patent and Trademark Office*